United States Patent Office 3,308,092
Patented Mar. 7, 1967

3,308,092
TRIS-TRIS AND BIS-TRIS SILOXYSILANES
Charles W. Lentz, Midland, Mich., assignor to Dow Corning Corporation, Midland, Mich., a corporation of Michigan
No Drawing. Filed Aug. 28, 1963, Ser. No. 305,190
4 Claims. (Cl. 260—46.5)

This invention relates to new silanes.
More specifically, this invention relates to tris[tris(trimethylsiloxy)siloxy]chlorosilane, $\{[(CH_3)_3SiO]_3SiO\}_3SiCl$; tris[tris(trimethylsiloxy)siloxy]-methylsilane, $\{[(CH_3)_3SiO]_3SiO\}_3SiCH_3$; bis[tris(trimethylsiloxy)siloxy]methylchlorosilane, $\{[(CH_3)_3SiO]_3SiO\}_2Si(CH_3)Cl$; and bis[tris(trimethylsiloxy)siloxy]methylsilanol, $\{[(CH_3)_3SiO]_3SiO\}_2Si(CH_3)(OH)$.

The silanes of this invention that are waxy solids at room temperature are useful, for example, as ingredients in waxes and polishes to give protective coatings. These silanes can also be dissolved in solvents and the solvent solutions used to cast protective films of the silanes on glass, metals, etc. The silanes of this invention that are liquids at room temperature are useful, for example, as fluid springs, hydraulic fluids and lubricants.

The tris[tris(trimethylsiloxy)siloxy]chlorosilane is prepared by reacting silicon tetrachloride, $SiCl_4$, and tris(trimethylsiloxy)silanol, $[(CH_3)_3SiO]_3SiOH$, in the presence of an HCl acceptor.

The tris[tris(trimethylsiloxy)siloxy]methylsilane and bis[tris(trimethylsiloxy)siloxy]methylchlorosilane are prepared by the reaction of methyltrichlorosilane, $CH_3SiCl_3$, and tris(trimethylsiloxy)silanol in the presence of an HCl acceptor.

The bis[tris(trimethylsiloxy)siloxy]methylsilanol is prepared by the hydrolysis of the bis[tris(trimethylsiloxy)siloxy]methylchlorosilane.

In order that those skilled in the art can better understand how the present invention can be practiced, the following examples are given by way of illustration and not by way of limitation.

In the examples, the purity of the compounds was confirmed using an F and M Vapor Phase Chromatography, model 500 apparatus and the structure of the compounds confirmed by infrared spectroscopy.

Example 1

5.75 ml. (.05 mol) of $SiCl_4$, 100 ml. of toluene and 20 ml. (.204 mol) of alpha-picoline were placed in a 500 ml. flask and stirred. Then the addition of 72.6 g. (.21 mol) of $[(CH_3)_3SiO]_3SiOH$ (about 90% pure) was started. About 45 minutes after the addition of the silanol was started the reactants became too viscous so an addition 100 ml. of toluene was added to the flask. The addition of the silanol was finished about one hour and 35 minutes after it was started. The mixture was allowed to stir about 20 minutes after all of the silanol had been added. The mixture was then heated to reflux temperature and maintained there for about one hour and 20 minutes. Then the heat was turned off and the agitator stopped to allow the alpha-picoline hydrochloride to solidify in the bottom of the flask. The solution was filtered and then allowed to stand overnight. The solution was stripped to remove the toluene and the residue transferred to a 200 ml. flask for fractionation. Collection of a fraction was begun at 142° C. at about .2 mm. of pressure. The temperature fluctuated considerably during the fractionation dropping to 119° C. at one point, rising to 178° C. at another point, and finally dropping to 118° C. at the end. The difficulty was due to solids plugging the column. 34 cc. of a viscous liquid was obtained which solidified to a waxy solid upon cooling to room temperature. This solid was $\{[(CH_3)_3SiO]_3SiO\}_3SiCl$. An interesting characteristic of this silane is that the chlorine attached to the silicon atom is not hydrolyzable.

ANALYSIS

|  | Theoretical | Found |
|---|---|---|
| Percent C | 32.5 | 32.6 |
| Percent H | 8.1 | 8.4 |
| Percent Si | 36.5 | 36.8 |
| Percent Cl | 3.56 | 3.22 |
| Percent Cl hydrolyzable | 3.56 | Nil |
| Molecular weight | 996.5 | 1,076 |

Example 2

To a one liter flask, 20.5 ml. (.175 mol) of $CH_3SiCl_3$, 500 ml. of benzene and 54 ml. of alpha-picoline were added. Then 200 g. (.576 mol) of $[(CH_3)_3SiO]_3SiOH$ (about 90% pure) added to the flask, with stirring, over a period of about 1½ hours through a funnel. The addition funnel was then rinsed with 50 ml. of benzene. The mixture was then stirred for an additional ½ hour, then heated to reflux temperature and then allowed to cool overnight. The next day the solution was filtered, the filtrate then being azeotroped and stripped to a pot temperature of 150° C. The pot residue was then fractionated with about 63 g. of material being removed over a temperature range of 80° to 189° C. The remaining liquid was then cooled for vacuum distillation. Next about 78.5 g. of material was removed over a temperature range of 114° to 115° C. at 38 mm. of pressure. The remaining liquid was again cooled and then about 64.5 g. of $\{[(CH_3)_3SiO]_3SiO\}_2Si(CH_3)Cl$ (I) was collected over a temperature range of 70° to 122° C. at .2 to .3 mm. of pressure. This compound is a liquid at room temperature. Finally, about 37 g. of $\{[(CH_3)_3SiO]_3SiO\}_3SiCH_3$ (II) was collected over a temperature range of 167 to 173° C. at about .25 mm. of pressure.

ANALYSIS OF I

|  | Theoretical | Found |
|---|---|---|
| Percent C | 32.6 | 33.3 |
| Percent H | 8.15 | 8.53 |
| Percent Si | 36 | 36.1 |
| Percent Cl | 5.07 | 4.45 |
| Percent Cl hydrolyzable | 5.07 | 4.35 |

ANALYSIS OF II

|  | Theoretical | Found |
|---|---|---|
| Percent C | 34.4 | 34.54 |
| Percent H | 8.6 | 9.19 |
| Percent Si | 37.3 | 37.5 |

Example 3

When the Compound I of Example 2 was hydrolyzed, the compound $\{[(CH_3)_3SiO]_3SiO\}_2Si(CH_3)(OH)$ was obtained.

That which is claimed is:
1. Tris[tris(trimethylsiloxy)siloxy]chlorosilane which has the formula $\{[(CH_3)_3SiO]_3SiO\}_3SiCl$.
2. Tris[tris(trimethylsiloxy)siloxy]methylsilane which has the formula $\{[(CH_3)_3SiO]_3SiO\}_3SiCH_3$.
3. Bis[tris(trimethylsiloxy)siloxy]methylchlorosilane which has the formula $\{[(CH_3)_3SiO]_3SiO\}_2Si(CH_3)Cl$.
4. Bis[tris(trimethylsiloxy)siloxy]methylsilanol which has the formula $\{[(CH_3)_3SiO]_3SiO\}_2Si(CH_3)(OH)$.

No references cited.

TOBIAS E. LEVOW, *Primary Examiner.*

P. F. SHAVER, *Assistant Examiner.*